United States Patent
Nakai (10) Patent No.: US 10,073,663 B2
(45) Date of Patent: Sep. 11, 2018

(54) NETWORK DEVICE CONFIGURED TO PROVIDE REBOOT ERROR INFORMATION, CONTROL METHOD THEREFOR, STORAGE MEDIUM STORING CONTROL PROGRAM THEREFOR, AND MONITORING SYSTEM USING NETWORK DEVICE

(71) Applicant: CANON KABUSHIKI KAISHA, Tokyo (JP)

(72) Inventor: Hironobu Nakai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/456,867

(22) Filed: Mar. 13, 2017

(65) Prior Publication Data

US 2017/0269883 A1 Sep. 21, 2017

(30) Foreign Application Priority Data

Mar. 18, 2016 (JP) .................................. 2016-055437

(51) Int. Cl.
  *G06F 3/12* (2006.01)
  *H04L 12/24* (2006.01)
  *H04N 1/00* (2006.01)

(52) U.S. Cl.
  CPC .......... *G06F 3/1234* (2013.01); *G06F 3/1211* (2013.01); *G06F 3/1285* (2013.01); *H04L 41/0213* (2013.01); *H04N 1/00411* (2013.01); *H04N 2201/0094* (2013.01)

(58) Field of Classification Search
  None
  See application file for complete search history.

(56) References Cited

U.S. PATENT DOCUMENTS

2012/0110313 A1* 5/2012 Eylon ................... G06F 9/4401
                                                         713/2
2014/0082173 A1* 3/2014 Kaneko .............. H04N 1/00344
                                                         709/223

FOREIGN PATENT DOCUMENTS

JP          2003316465 A    * 11/2003

* cited by examiner

*Primary Examiner* — Andrew H Lam
(74) *Attorney, Agent, or Firm* — Rossi, Kimms & McDowell LLP (57) ABSTRACT

A network device that is capable of notifying of a factor of an error when reboot in response to an instruction cannot be performed due to an operating state. The network device is connected to a network. A receiving unit receives a reboot instruction through the network. A determination unit determines propriety of reboot based on an operating state of the network device when the receiving unit receives a reboot instruction. A reply unit replies information indicating no error when the determination unit determines that reboot is available, and replies information indicating an error together with information indicating a factor of unavailable reboot when the determination unit determines that reboot is unavailable.

9 Claims, 8 Drawing Sheets

⊟data: set-request (3)
  ⊟set-request               701
     request-id: 8
     error-status: noError (0)
     error-index: 0
    ⊟variable-bindings: 1 item
      ⊟printer-MIB::prtGeneralReset.1 (1.3.6.1.2.1.43.5.1.1.3.1):
        object Name: 1.3.6.1.2.1.43.5.1.1.3.1 (Printer-MIB::prtGeneralReset.1)
        value (Integer32): 3
                702

FIG. 7B

⊟data: get-response (2)
  ⊟get-response            703
     request-id: 8
     error-status: noError (0)
     error-index: 0
    ⊟variable-bindings: 1 item
      ⊟printer-MIB::prtGeneralReset.1 (1.3.6.1.2.1.43.5.1.1.3.1):
        object Name: 1.3.6.1.2.1.43.5.1.1.3.1 (Printer-MIB::prtGeneralReset.1)
        value (Integer32): 3
                704

FIG. 8A

☐ data: set-request (3)
  ☐ set-request           801
      request-id: 10
      error-status: noError (0)
      error-index: 0
    ☐ variable-bindings: 1 item
      ☐ printer-MIB::prtGeneralReset.1 (1.3.6.1.2.1.43.5.1.1.3.1):
          object Name: 1.3.6.1.2.1.43.5.1.1.3.1 (Printer-MIB::prtGeneralReset.1)
          value (Integer32): 6
                    802

FIG. 8B

☐ data: get-response (2)
  ☐ get-response          803
      request-id: 10
      error-status: badvalue (3)
      error-index: 1
    ☐ variable-bindings: 1 item
      ☐ printer-MIB::prtGeneralReset.1 (1.3.6.1.2.1.43.5.1.1.3.1):
          object Name: 1.3.6.1.2.1.43.5.1.1.3.1 (Printer-MIB::prtGeneralReset.1)
          value (Integer32): ⑥
                    804

NETWORK DEVICE CONFIGURED TO PROVIDE REBOOT ERROR INFORMATION, CONTROL METHOD THEREFOR, STORAGE MEDIUM STORING CONTROL PROGRAM THEREFOR, AND MONITORING SYSTEM USING NETWORK DEVICE

BACKGROUND OF THE INVENTION

Field of the Invention

The present invention relates to a technique about a reboot process of a network device connected to a network.

Description of the Related Art

There is a known monitoring system that is configured by connecting a network device (hereinafter referred to as a device), such as an image forming apparatus, to a monitoring apparatus, such as a monitoring terminal, through a network. In this system, a device is managed using the SNMP (Simple Network Management Protocol) and MIB (Management Information Base) information, for example.

When the monitoring apparatus changed various settings of the device, reboot of the device may be needed in order to reflect the changed settings. Japanese Laid-Open Patent Publication (Kokai) No. 2003-316465 (JP 2003-316465A) discloses a method of writing into an MIB object for performing a reboot process using the SNMP as a remote reboot method from a monitoring apparatus. The monitoring apparatus determines whether remote reboot of the device is available. When the remote reboot is available, the monitoring apparatus instructs the remote reboot. When the remote reboot is unavailable, the monitoring apparatus displays a message to urge the reclosing of power. Accordingly, the device is guided so as to be rebooted.

The method of instructing the remote reboot from the monitoring apparatus to the device is achievable by writing a rated value to "prtGeneralReset" via the SNMP. The "prtGeneralReset" is an MIB object standardized by RFC (Request for Comments).

Incidentally, the device may receive the reboot instruction from remoteness during an operation. For example, when the image forming apparatus as a network device receives a reboot instruction during a copy process or a print process, the process may be interrupted and a reboot process may be suddenly started according to the reboot instruction. Moreover, the same situation may occur also when a reboot instruction is received during a user's operation, such as maintenance. In order to avoid such an unpreferable situation, the image forming apparatus is required not to receive a reboot instruction and to reply that a process corresponding to the reboot instruction cannot be performed when receiving a reboot instruction during the process of a job.

Although the error code defined by the protocol level of the SNMP allows a reply that expresses the error of the reboot instruction, the operating state (In-job, In-maintenance, etc.) cannot be added to a replay using the error code. Accordingly, since the supervisory unit cannot distinguish a reason why the image forming apparatus could not reboot, the factor of the error is unknown, and a simple retry process that repeats a reboot process will be performed. Then, the monitoring apparatus fails the retry process soon, and will have no choice but to display guidance to request a user's operation as a result.

SUMMARY OF THE INVENTION

The present invention provides a technique to notify of a factor of an error when reboot in response to an instruction cannot be performed due to an operating state.

Accordingly, a first aspect of the present invention provides a network device connected to a network including a receiving unit configured to receive a reboot instruction through the network, a determination unit configured to determine propriety of reboot based on an operating state of the network device when the receiving unit receives a reboot instruction, and a reply unit configured to reply information indicating no error when the determination unit determines that reboot is available, and to reply information indicating an error together with information indicating a factor of unavailable reboot when the determination unit determines that reboot is unavailable.

Accordingly, a second aspect of the present invention provides a monitoring system including the network device of the first aspect and a monitoring apparatus that is connected to the network device through the network, and transmits the reboot instruction to the network device through the network.

Accordingly, a third aspect of the present invention provides a control method for a network device connected to a network, the control method including a receiving step of receiving a reboot instruction through the network, a determination step of determining propriety of reboot based on an operating state of the network device when a reboot instruction is received in the receiving step, and a reply step of replying information indicating no error when it is determined that reboot is available in the determination step, and of replying information indicating an error together with information indicating a factor of unavailable reboot when it is determined that reboot is unavailable in the determination step.

Accordingly, a fourth aspect of the present invention provides a non-transitory computer-readable storage medium storing a control program causing a computer to execute the control method of the third aspect.

According to the present invention, the factor of an error is notified when reboot in response to an instruction cannot be performed due to an operating state.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
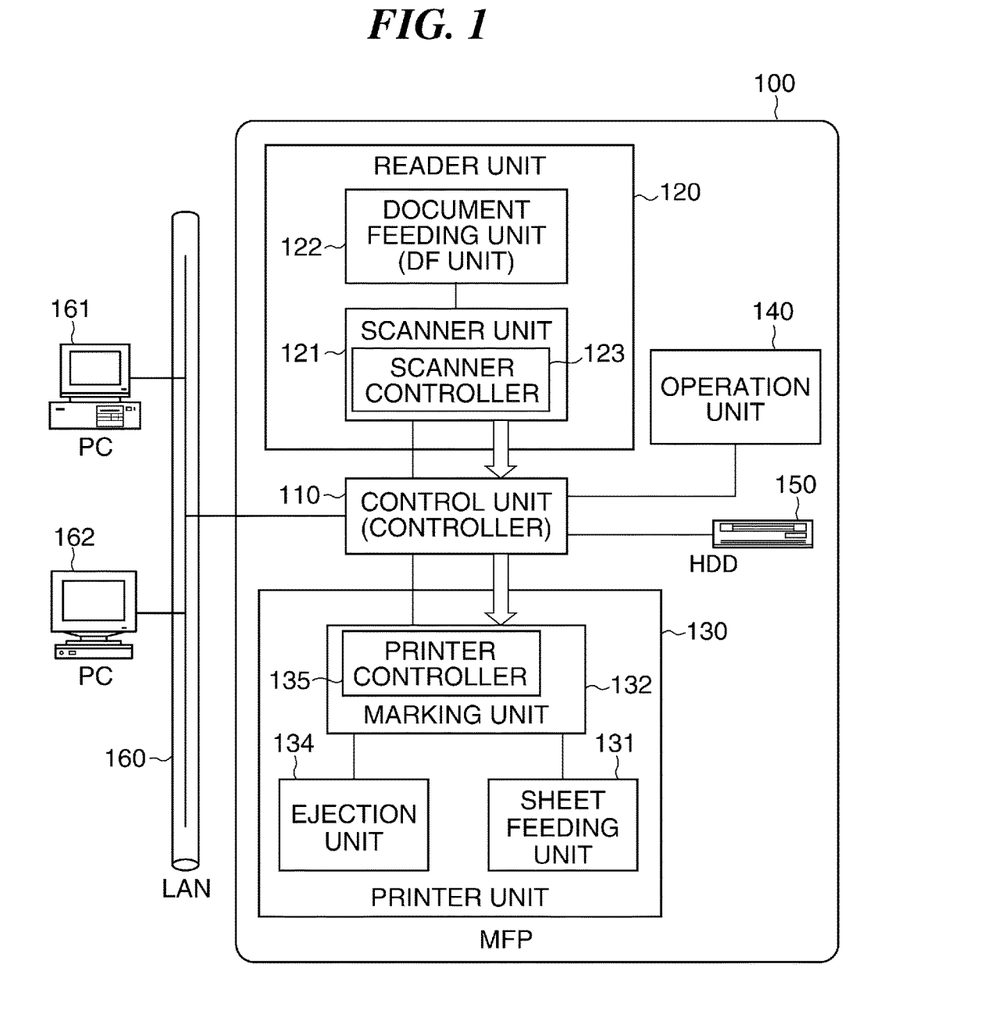
FIG. 1 is a view showing the entire configuration of a monitoring system including a network device according to an embodiment of the present invention.

FIG. 1 is a view showing the entire configuration of a monitoring system including a network device according to an embodiment of the present invention. The monitoring system is configured by connecting an image forming apparatus 100 as a network device to monitoring terminals 161 and 162 as monitoring apparatuses through a network 160. It should be noted that there is at least one monitoring terminal or there may be three or more terminals. Moreover, the network device is not limited to the image forming apparatus 100.

In the embodiment, an MFP (Multi-Function Peripheral) that has a plurality of functions, such as a copy function and a printer function, is employed as an example of the image forming apparatus 100. It should be noted that the image forming apparatus 100 may be an SFP (Single Function Peripheral) that has only a copy function or a printer function. First, a configuration example of the image forming apparatus will be described with reference to FIG. 1.

A control unit (controller) 110 is electrically connected with a reader unit 120 and a printer unit 130. The control unit 110 receives data from the reader unit 120 and the printer unit 130. The control unit 110 transmits various commands to the reader unit 120 and the printer unit 130. Furthermore, the control unit 110 receives image data and control commands from the monitoring terminals 161 and 162 connected through the network 160. The network 160 is built with the Ethernet (registered trademark), for example. The monitoring terminals 161 and 162 are external monitoring apparatuses that monitor configuration information and current status information about the image forming apparatus 100.

The reader unit 120 reads an image of an original optically, and converts it into image data. The reader unit 120 is provided with a scanner unit 121 that has a function to read an original, and a document feeding unit 122 that conveys an original to a position at which the scanner unit 121 is readable. A scanner controller 123 of the scanner unit 121 controls the scanner unit 121 and the document feeding unit 122 according to an instruction from the control unit 110.

The printer unit 130 has an image-formation function. That is, the printer unit 130 is provided with a sheet feeding unit 131 that stores paper sheets (paper sheets or recording materials) for image formation (print), a marking unit 132 that transfers and fixes image data to a paper sheet, and an ejection unit 134 that ejects a printed paper sheet. A printer controller 135 of the marking unit 132 controls the marking unit 132, the sheet feeding unit 131, and the ejection unit 134 according to an instruction from the control unit 110. The printer unit 130 makes the sheet feeding unit 131 feed a paper sheet to the marking unit 132 according to an instruction from the control unit 110, makes the marking unit 132 print image data to the paper sheet concerned, and then makes the ejection unit 134 eject the paper sheet concerned. The ejection unit 134 is able to apply processes, such as sorting and stapling, to the paper sheets printed by the marking unit 132. The sheet feeding unit 131 is provided with a plurality of sheet cassettes, and paper sheets are stored in each of the sheet cassettes. The sheet cassettes are able to store a plurality of kinds of paper sheets, such as regular paper sheets and coated paper sheets, for example.

An operation unit 140 is provided with hard keys, an LCD unit, and a touch panel pasted on the LCD unit, for example, and receives an instruction from a user through them. Moreover, the operation unit 140 is able to display soft keys and a function and state of the image forming apparatus 100 on the LCD unit. The operation unit 140 transmits a command corresponding to an instruction from a user to the control unit 110. Moreover, an HDD (Hard Disk Drive) 150 stores various settings of the image forming apparatus 100 and image data.

Based on the above-mentioned configuration, the image forming apparatus 100 achieves various functions, such as a copy function, an image data transmitting function, and a printer function, for example. When achieving the copy function, the control unit 110 controls so that the reader unit 120 reads image data of an original and the printer unit 130 prints the image data concerned on a paper sheet. When achieving the image data transmitting function, the control unit 110 converts the image data of the original read by the reader unit 120 into code data and transmits the code data concerned to the monitoring terminals 161 and 162 through the network 160. Furthermore, when achieving the printer function, the control unit 110 converts the code data (print data) received from the monitoring terminals 161 and 162 through the network 160 into image data and transmits the image data to the printer unit 130. The printer unit 130 prints the image data received onto a paper sheet.

Next, the standard technology will be described. The IETF (Internet Engineering Task Force) has issued the RFC (Request for Comments) for the purpose of a standardization of the technique used on the Internet. Technology of obtaining information from a network device on the basis of the RFC will be described.

The SNMP (Simple Network Management Protocol) is generally and widely used as an information monitoring protocol for a device on a network. A network device managed by the SNMP mounts the MIB (Management Information Base) information, and is managed by responding to an SNMP request from a monitoring terminal. SNMP requests from a monitoring terminal are roughly divided into an information obtaining system and an information setting system. There are some specifications about the configuration of the MIB information, such as the specification standardized by the IETF, the specification industry-standardized by the PWG (Printer Working Group), and a private MIB specification extended uniquely by a vender, etc.

The MIB information has a hierarchical structure according to field, the serial numbers are allocated to respective branches, and what connected the serial numbers is called the OID (Object Identifier). The MIB prescribes the hierarchical structure, contents of information about an object having the OID, and a data type of the object. The MIB may be prescribed by various kinds of RFCs, and may be private information uniquely extended by an enterprise. The RFC has regulation as the SMI (Structure of Management Information) also about definition of a data type. The definition of a data type is expressed in the description language ASN.1 (Abstract Syntax Notation One) prescribed by the ISO and ITU-T. It should be noted that the technical specification of the RFC is not fixed and is updated by progress in technology. A serial number xxx is added to the RFC like "RFCxxxx". When the specification exhibited once is updated, the conventional serial number is treated as an obsolete number and a new serial number is allocated.

As the RFC aiming status monitoring and setting of an image forming apparatus among apparatuses connected to a network, the RFC3805-Printer MIB v2 has been defined. This prescribes the OID "prtGeneralReset" that allows a monitoring terminal remotely reboots an image forming apparatus.

The extract of (a) "prtGeneralReset OBJECT-TYPE" will be described in the following about descriptions of "prtGeneralReset" and its range. Furthermore, the extract of (b) "PrtGeneralResetTC::=TEXTUAL-CONVENTION" will be described in the following.

(a) prtGeneralReset OBJECT-TYPE
--NOTE: In RFC 1759, the enumeration values were
--implicitly defined by this object.
SYNTAX PrtGeneralResetTC
MAX-ACCESS read-write
STATUS current
DESCRIPTION "Setting this value to 'powerCycleReset', 'resetToNVRAM', or 'resetToFactoryDefaults' will result in the resetting of the printer. When read, this object will always have the value 'notResetting(3)', and a SET of the value 'notResetting' shall have no effect on the printer. Some of the defined values are optional. However, every implementation must support at least the values 'notResetting' and 'resetToNVRAM'."
::={prtGeneralEntry 3}
(b) PrtGeneralResetTC::=TEXTUAL-CONVENTION
--This TC was extracted from prtGeneralReset in RFC 1759.
STATUS current
DESCRIPTION "Values for reading and writing the prtGeneralReset object. If a device does not have NVRAM, the device shall none the less respond to a SET with the value resetToNVRAM(5) with a sort of warm reset that resets the device to implementation-defined state that is preferably under control of the system administrator by some means outside the scope of the Printer MIB specification."

```
SYNTAX INTEGER {
notResetting(3),
powerCycleReset(4), -- Cold Start
resetToNVRAM(5), -- Warm Start
resetToFactoryDefaults(6) -- Reset contents of
-- NVRAM to factory
-- defaults
}
```

On the other hand, a rated value that is used as an error code in a protocol level is defined in the SNMP. The definition of a rated value will be described below. The value within brackets is a rated value. Since a range of an available rated value differs according to a protocol version of the SNMP, the related values will be described for two divided cases of (a) SNMPv1 (version 1) and (b) SNMPv2 and v3 (versions 2 and 3).

(a) SNMPv1 error-status (extract)
noError(0): There is no error.
tooBig(1): Value cannot be set to response packet because data size is too big.
noSuchName(2): There is no designated OID or writing is unable.
badValue(3): Set value is bad.
readOnly(4): Writing is unable.
genErr(5): Error other than codes 0 through 4 occurs.

(b) SNMPv2/v3 error-status (extract)
noError(0): There is no error.
tooBig(1): Value cannot be set to response packet because data size is too big.
noSuchName(2): There is no designated OID or writing is unable.
badValue(3): Set value is bad.
readOnly(4): Writing is unable.
genErr(5): Error other than codes 0 through 4 occurs.
noAccess(6): Set was tried to inaccessible OID.
wrongType(7): Type different from type required by OID was designated.
wrongLength(8): Length different from data length required by OID was designated.
wrongEncoding(9): Encoding in ASN.1 is wrong.
wrongValue(10): Set value is wrong.
noCreation(11): Applicable OID is not given.
inconsistentValue(12): Value cannot be set now due to some reason.
resourceUnavailable(13): Resource cannot be used although resource is required for setting value.
commitFailed(14): Update of value failed.
undoFailed(15): When update of value failed, updated value cannot be restored to original value.
authorizationError(16): Authentication failed.
notWritable(17): Writing is unable.
inconsistentName(18): Since applicable OID is not given, it cannot create now.

Figure 7A:
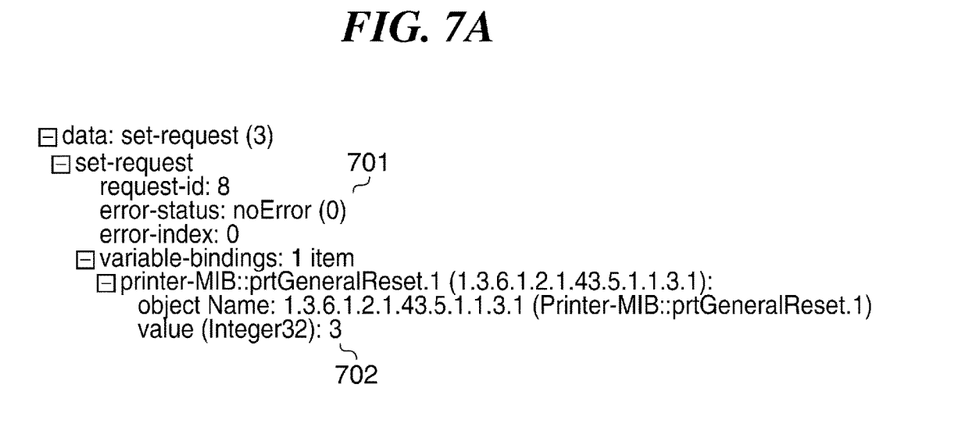
FIG. 7A and FIG. 7B are views respectively showing examples of a transmission packet and a reply packet that are prepared when writing succeeded in the monitoring system shown in FIG. 1.
Figure 7B:
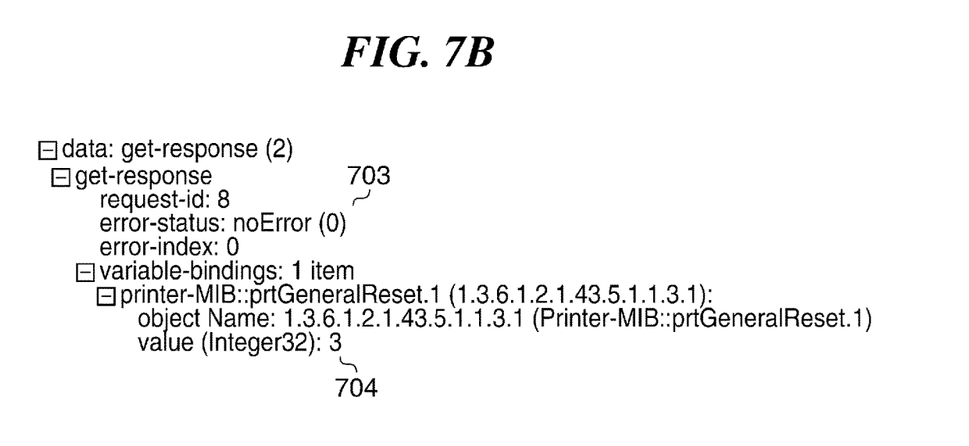
Figure 8A:
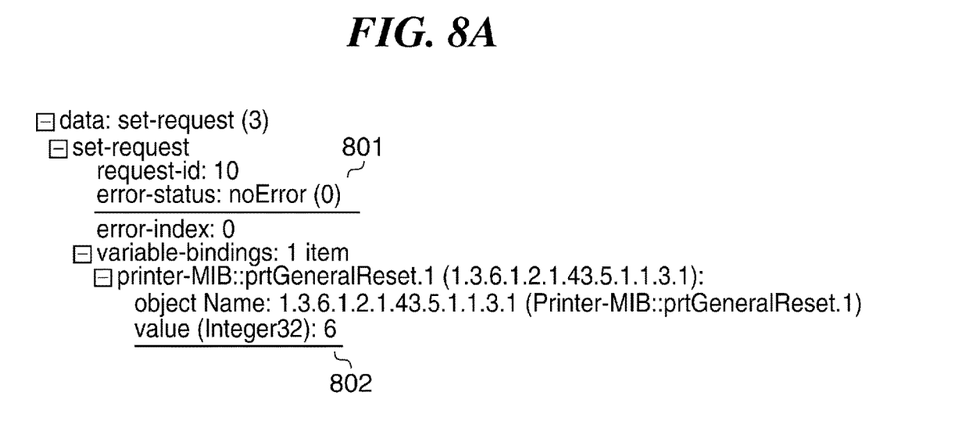
FIG. 8A and FIG. 8B are views respectively showing examples of a transmission packet and a reply packet that are prepared when writing failed in the monitoring system shown in FIG. 1.
Figure 8B:
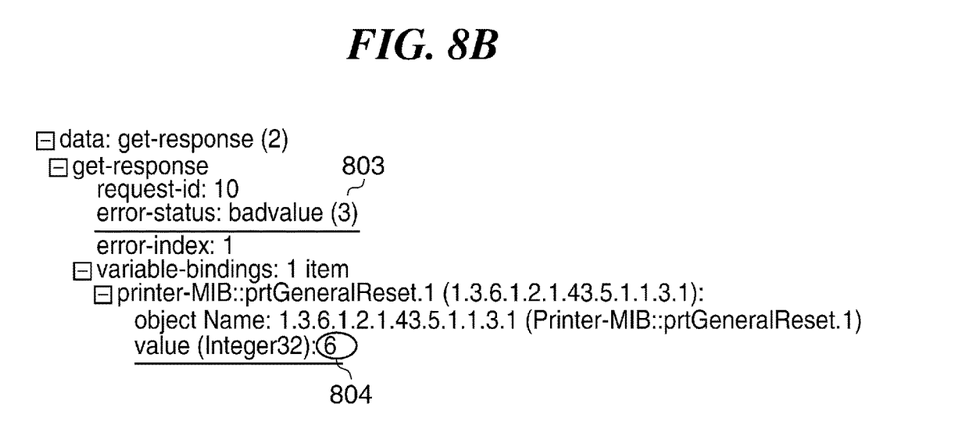

Next, set-request and get-response in the SNMP protocol will be described. FIG. 7A and FIG. 7B are views respectively showing examples of a transmission packet and a reply packet that are prepared when writing to prtGeneralReset of an MIB object using the SNMP succeeded. FIG. 8A and FIG. 8B are views respectively showing examples of a transmission packet and a reply packet that are prepared when writing to prtGeneralReset of an MIB object using the SNMP failed. Hereafter, since the configuration and operation of the monitoring terminals 161 and 162 are identical, the monitoring terminal 161 will be described as a representative when they are not distinguished in particular.

When the monitoring terminal 161 sets the value of the MIB with the SNMP to the image forming apparatus 100, the packet shown in FIG. 7A is transmitted. When writing with the SNMP, the error status in the protocol level of the SNMP is arranged to be noError(0) as shown by the reference numeral 701. The monitoring terminal 161 designates notResetting(3) as a rated value of prtGeneralReset shown by the reference numeral 702. That is, the rated value that shows not performing a reboot process is designated as an argument.

When receiving the packet shown in FIG. 7A, the image forming apparatus 100 replies the packet shown in FIG. 7B to the transmitting source of the packet shown in FIG. 7A. The rated value noError(0) shown by the reference numeral 703 shows that there is no error status in the packet level of the SNMP. The rated value notResetting(3) shown by the reference numeral 704 shows that writing succeeded.

Next, the case where the writing of the SNMP failed will be described. When the monitoring terminal 161 sets the MIB value of the SNMP to the image forming apparatus 100, the packet shown in FIG. 8A is transmitted. When writing in the SNMP, the error status in the protocol level of the SNMP is arranged to be noError(0) as shown by the reference numeral 801. The monitoring terminal 161 designates resetToFactoryDefaults(6) as a rated value of prtGeneralReset shown by the reference numeral 802. That is, the rated value that shows performing a reboot process after returning to a factory default state is designated as an argument.

When receiving the packet shown in FIG. 8A, the image forming apparatus 100 replies the packet shown in FIG. 8B to the transmitting source of the packet shown in FIG. 8A. The rated value badValue(3) shown by the reference numeral 803 is an error code meaning that a setting value is bad as an error status in the packet level of the SNMP. This is designated by the image forming apparatus 100. Since it is not necessary that the image forming apparatus 100 implement all the ranges prescribed by the RFC, a mounting configuration that replies with badValue(3) when a non-supporting range (a value outside the supported range) is set is possible on the RFC. The rated value resetToFactoryDefaults(6) shown by the reference numeral 804 shows that the writing failed.

In this example, the failure of the reboot process after resetting to the factory default state is surely readable. However, it is not sure whether the reboot process failed because the setting value was a value outside the implement range or the reboot process failed temporary because the image forming apparatus 100 is in an operating state (under execution of another process) that disables the reboot process. Moreover, even if an error code of the SNMPv3 shows that the process cannot be performed temporarily, it is impossible to show the reason why the process cannot be performed temporarily.

Figure 2:
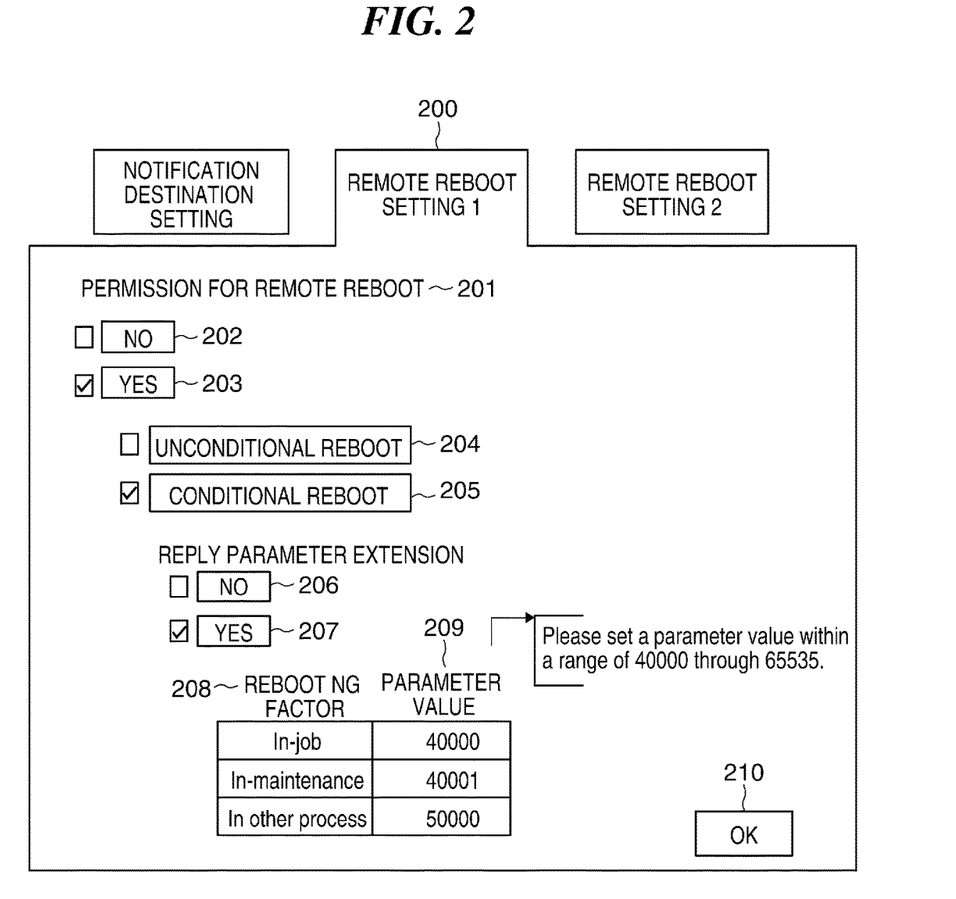
FIG. 2 is a view showing an example of a first setting screen for remote reboot setting that is displayed on an image forming apparatus shown in FIG. 1.

Next, the remote reboot setting in the image forming apparatus 100 will be described. FIG. 2 is an example of a first setting screen of the remote reboot setting. The first setting screen 200 is displayed on the operation unit 140. In the first setting screen 200, a permission setting 201 is a setting item of whether to permit the reboot from remoteness. When a no-permission setting 202 is selected in the permission setting 201, the reboot instruction from remoteness is not received. When a permission setting 203 is selected, the reboot from remoteness is permitted.

When the permission setting 203 is selected, a user is able to establish whether the reboot process starts unconditionally. In a case where the unconditional reboot 204 is selected, the reboot process is started promptly in response to a remote reboot instruction from the monitoring terminal 161 as long as there is no factor that causes an error, such as sheet jam, after reboot. Accordingly, if there is no error factor, the reboot process is started promptly even if the operating state of the image forming apparatus 100 is under execution of a process, such as a print process. On the other hand, when a conditional reboot 205 is selected, the reboot process starts conditionally in response to the remote reboot instruction from the monitoring terminal 161. If a condition is not satisfied, the image forming apparatus 100 does not perform the reboot process, and needs to reply that the reboot process failed to the monitoring terminal 161. Accordingly, when the conditional reboot 205 is selected, a user establishes whether a reply parameter for replying that the reboot process failed is extended.

When a no-extension setting 206 is selected, the reply parameter is created within the range prescribed by the RFC (the range prescribed as an attribute value of the MIB object). For example, resetToFactoryDefaults(6) shown by the reference numeral 804 in FIG. 8B corresponds to this. On the other hand, when an extension setting 207 is selected, the user is able to set up the factor (reboot NG factor) of failure of the reboot process and the parameter value corresponding to the factor. There are a plurality of operating states that become the reboot NG factors 208. The user is able to set reply-parameter values (parameter values of the OID) corresponding to resetToFactoryDefaults(6) shown by the reference numeral 804 as the parameter values 209 for the respective factors. While resetToFactoryDefaults(6) are values within the range prescribed as the attribute values of the MIB object, the corresponding reply parameters are values outside the range prescribed as the attribute values of the MIB object.

In the reboot NG factor 208, "In-job" means that a print job is executing, "In-maintenance" means that maintenance is being performed, and "In other process" means a process other than a print job and maintenance is executing. As examples of the parameter values 209, "40000", "40001", and "50000" are respectively set up to "In-job", "In-maintenance", and "In other process". When an OK button 210 is pressed, the contents of the remote reboot setting in the first setting screen at the present time are fixed, and the setting values are transmitted from the operation unit 140 to the control unit 110. Then, the control unit 110 performs the remote reboot process on the basis of the received setting values.

Figure 3:
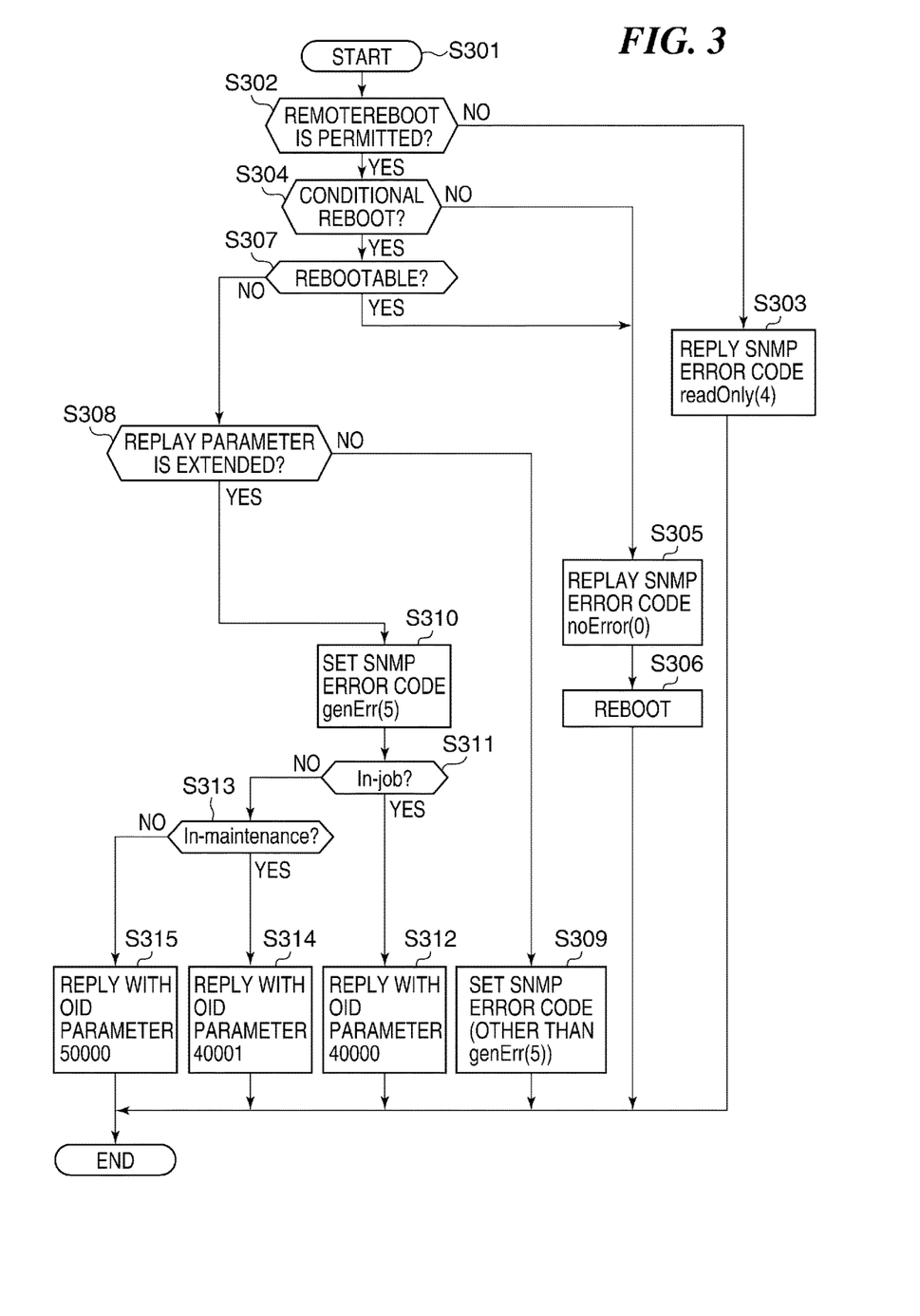
FIG. 3 is a flowchart showing a reboot process executed by the image forming apparatus shown in FIG. 1.

FIG. 3 is a flowchart showing the reboot process executed by the image forming apparatus 100. The process of this flowchart is achieved when a CPU of the control unit 110 of the image forming apparatus 100 reads and runs a program stored in a ROM or the HDD 150. Hereinafter, the case where the reboot instruction is transmitted from the monitoring terminal 161 will be described.

When receiving the reboot instruction from the remote monitoring terminal 161, the image forming apparatus 100 starts the reboot process in step S301. The control unit 110 corresponds to the reception unit in the present invention. In step S302, the control unit 110 determines whether the reboot from remoteness is permitted. This is determined according to the setting contents (settings 202 and 203) in the remote reboot setting (FIG. 2). Then, when the reboot from remoteness is permitted, the process proceeds to step S304. When the reboot from remoteness is not permitted, the process proceeds to step S303. In the step S303, the control unit 110 sets readOnly(4) (=writing is unable) to the parameter value of the error code error-status prescribed by the SNMP, and performs the reply process to the monitoring terminal 161. In this case, the process in FIG. 3 is finished without rebooting the apparatus.

In the step S304, the control unit 110 determines whether the conditional reboot has set up on the basis of the setting contents (204, 205) in the remote reboot setting (FIG. 2). Then, when the conditional reboot has set up, the process proceeds to step S307. When the conditional reboot has not set up, the process proceeds to step S305. In the step S305, the control unit 110 sets noError(0) to the parameter value of the above-mentioned error-status, and performs the reply process to the monitoring terminal 161. The rated value noError(0) corresponds to information indicating that there is no error. Next, the reboot process is started in step S306. In this case, the control unit 110 starts the reboot process promptly even under execution of a process, such as a print process as long as there is no factor that causes an error, such as sheet jam, after reboot. Then, the process in FIG. 3 finishes.

In step S307, the control unit 110 determines whether the image forming apparatus 100 is rebootable on the basis of the current operating state thereof. For example, the control unit 110 determines that it is not rebootable when the operating state of the image forming apparatus 100 corresponds to the execution of a print job, maintenance, or another process. In the other cases, the control unit 110 determines to be rebootable. The control unit 110 corresponds to the determination unit in the present invention. Then, the control unit 110 proceeds with the process to the step S305 when it is rebootable. In this case, the reboot process is started (step S306). On the other hand, when it is not rebootable, the process proceeds to step S308.

In the step S308, the control unit 110 determines whether the extension setting of the reply parameter is effective on the basis of the setting contents (206, 207) in the remote reboot setting (FIG. 2). Then, when the extension setting of the reply parameter is not effective, the process proceeds to step S309. When the extension setting of the reply parameter is effective, the process proceeds to step S310. In the step S309, the control unit 110 sets a value (another error code) other than genErr(5) to the parameter value of the above-mentioned error-status, performs the reply process to the monitoring terminal 161, and finishes the process in FIG. 3.

In the step S310, the control unit 110 sets genErr(5) to the parameter value of the above-mentioned error-status. This genErr(5) corresponds to the information indicating an error resulting from the operating state. Next, in step S311, the control unit 110 determines whether the factor (reboot NG factor) by which it was determined that the reboot was unable in the step S307 is "In-job". And, when the reboot NG factor is "In-job", the process proceeds to step S312. In the step S312, the control unit 110 sets up resetToFactoryDefaults(6) (the parameter value of the OID shown by the reference numeral 804 in FIG. 8B). In this step, the control unit 110 sets up "40000" that was established to the parameter value 209 corresponding to "In-job" in the remote reboot setting (FIG. 2) to the parameter value of the OID, and performs the reply process to the monitoring terminal 161. The parameter value 209 corresponds to the information indicating the factor of the unavailable reboot. The parameter value 209 is replied to the monitoring terminal 161 together with genErr(5) set up in the step S310. Then, the process in FIG. 3 finishes. The control unit 110 corresponds to the reply unit in the present invention.

When the reboot NG factor is not "In-job", the control unit 110 determine whether the reboot NG factor is "In-maintenance" in step S313. And when the reboot NG factor is "In-maintenance", the process proceeds to step S314. In the step S314, the control unit 110 sets up resetToFactoryDefaults(6) (the parameter value of the OID shown by the reference numeral 804 in FIG. 8B). In this step, the control unit 110 sets up "40001" that was established to the parameter value 209 corresponding to "In-maintenance" in the remote reboot setting (FIG. 2) to the parameter value of the OID, and performs the reply process to the monitoring terminal 161. The parameter value 209 corresponds to the information indicating the factor of the unavailable reboot. The parameter value 209 is replied to the monitoring terminal 161 together with genErr(5) set up in the step S310. Then, the process in FIG. 3 finishes.

When the reboot NG factor is not "In-maintenance", it is determined that the reboot NG factor is another process, and the process proceeds to the step S315. In the step S315, the control unit 110 sets up resetToFactoryDefaults(6) (the parameter value of the OID shown by the reference numeral 804 in FIG. 8B). In this step, the control unit 110 sets up "50000" that was established to the parameter value 209 corresponding to "In other process" in the remote reboot setting (FIG. 2) to the parameter value of the OID, and performs the reply process to the monitoring terminal 161. The parameter value 209 corresponds to the information indicating the factor of the unavailable reboot. The parameter value 209 is replied to the monitoring terminal 161 together with genErr(5) set up in the step S310. Then, the process in FIG. 3 finishes.

Figure 4:
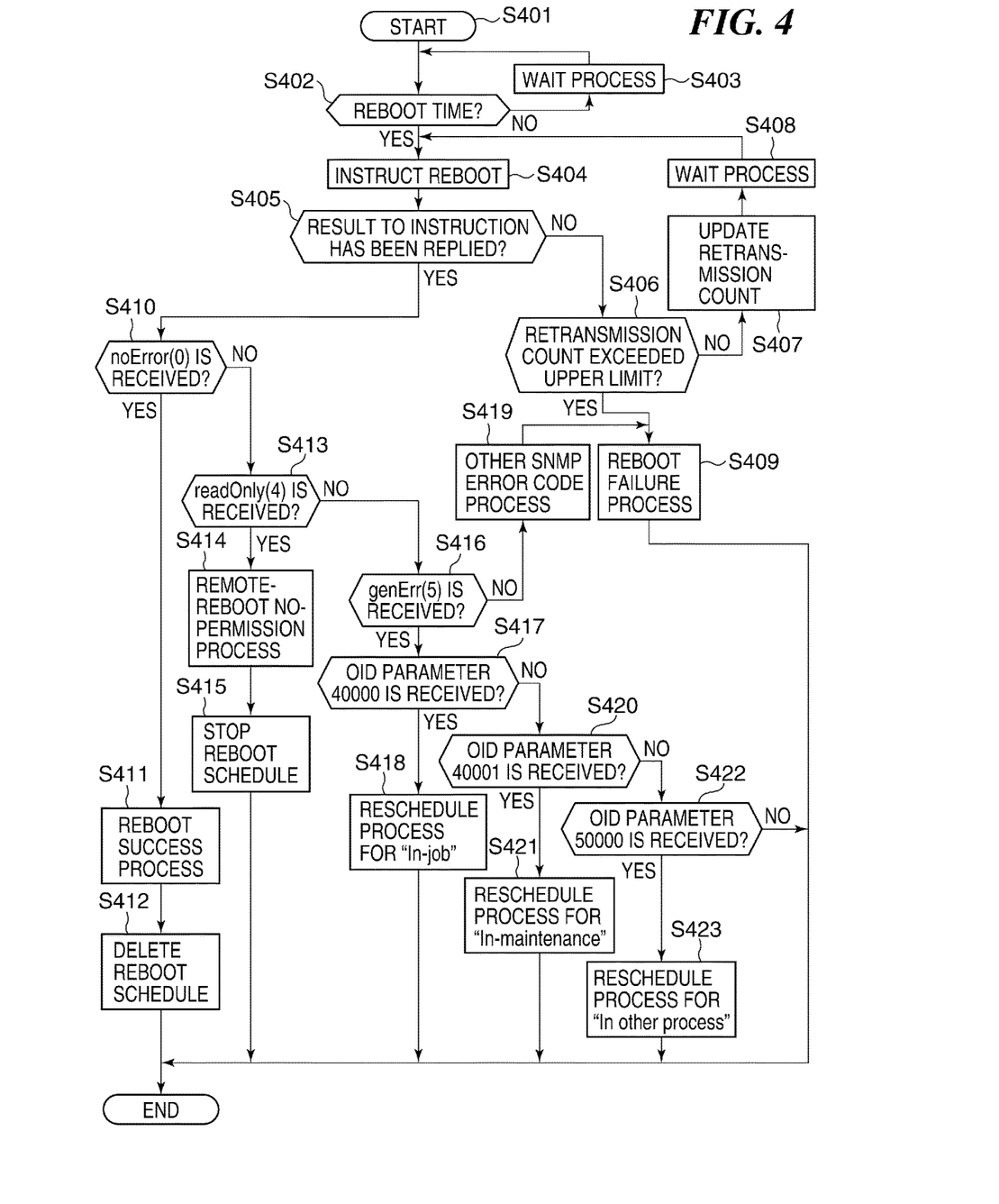
FIG. 4 is a flowchart showing a reboot instruction process executed by a monitoring apparatus shown in FIG. 1.

FIG. 4 is a flowchart showing a reboot instruction process executed by the monitoring terminal 161. A process in this flowchart is achieved when a CPU of the monitoring terminal 161 reads and runs a program stored in a storage unit, such as ROM, of the monitoring terminal 161.

A user's instruction starts the reboot instruction process for instructing reboot to the image forming apparatus 100 in step S401. The reboot instruction process proceeds according to a reboot schedule that was created in advance. In step S402, the monitoring terminal 161 determines whether the current time reached the time at which the reboot is instructed to the image forming apparatus 100. And when it does not reach the time at which the reboot is instructed, the process proceeds to step S403. The time at which the reboot is instructed is prescribed by the reboot schedule. In the step S403, the monitoring terminal 161 performs a wait process to wait in a predetermined wait time period, and then returns the process to the step S402 again. When the current time reached the time at which the reboot is instructed, the monitoring terminal 161 transmits the reboot instruction to the image forming apparatus 100 in step S404.

In the next step S405, the monitoring terminal 161 determines whether a result to the reboot instruction which transmitted has been replied from the image forming apparatus 100. In this step, whether the result has been replied may be determined by whether the result has been replied from the image forming apparatus 100 to the monitoring terminal 161 within a predetermined time period after transmitting the reboot instruction in the step S404. When no reply is received from the image forming apparatus 100, the monitoring terminal 161 proceeds with the process to step S406. When a reply is received processing change to step S410.

In the step S406, the monitoring terminal 161 determines whether the retransmission count of the reboot instruction exceeded the upper limit count. This upper limit count is prescribed by the reboot schedule so as to avoid an infinite loop of the process to retransmit the reboot instruction. As a result of the determination in the step S406, when the retransmission count does not exceed the upper limit count, the monitoring terminal 161 increments the count value of the retransmission count by one to update (step S407). Then, the monitoring terminal 161 performs the wait process in step S408 as with the step S403, and returns the process to the step S404. On the other hand, when the retransmission count exceeds the upper limit count, the monitoring terminal 161 performs a series of reboot failure processes in step S409. In this reboot failure process, the monitoring terminal 161 displays a message indicating that the reboot could not be instructed to the image forming apparatus 100 on a display unit thereof, and records a history of the failure of the reboot instruction. Then, the process in FIG. 4 finishes.

In step S410, the monitoring terminal 161 determines whether the error-status of which the value is noError(0) (reference numeral 703 in FIG. 7B) is given among the received information. As a result of the determination, when noError(0) has been received, the image forming apparatus 100 performs the step S305 in FIG. 3, and the monitoring terminal 161 is able to determine that the reboot instruction to the image forming apparatus 100 was successful. Accordingly, the monitoring terminal 161 performs a series of reboot success processes in step S411. For example, a history of the success of the reboot instruction is recorded. After that, the monitoring terminal 161 deletes the reboot schedule to the image forming apparatus 100 (step S412), and finishes the process in FIG. 4.

On the other hand, as a result of the determination in the step S410, when noError(0) has not been received, it is determined that the reboot instruction does not succeed. Accordingly, the monitoring terminal 161 determines whether the value of error-status is readOnly(4) in step S413. As a result of the determination, when readOnly(4) has been received, the image forming apparatus 100 performs the step S303 in FIG. 3, and the monitoring terminal 161 is able to determine that the reboot from remoteness is not permitted in the image forming apparatus 100. Accordingly, the monitoring terminal 161 performs a series of remote-reboot no-permission processes, such as a process for displaying that the remote reboot is not permitted on the display unit thereof, and a process for recording a history to that effect in step S414. In this state, since the reboot instruction continues failing unless the setting in the image forming apparatus 100 is changed, the monitoring terminal 161 stops the schedule for rebooting the image forming apparatus 100 in step S415. Then, the process in FIG. 4 finishes.

On the other hand, as a result of the determination in the step S413, when readOnly(4) is not received, the monitoring terminal 161 determines whether the value of error-status is genErr(5) in step S416. As a result of the determination, when genErr(0) has been received, the image forming apparatus 100 performs the step S310 in FIG. 3, and the monitoring terminal 161 is able to determine that the reboot was unavailable due to the operating state of the image forming apparatus 100. Accordingly, the monitoring terminal 161 first determines whether the parameter value of the OID equivalent to "resetToFactoryDefaults(6)" (shown by the reference numeral 804 in FIG. 8B) is "40000". As a result of the determination, when the parameter value of the OID is "40000", the monitoring terminal 161 is able to determine that the reboot was unavailable because the operating state of the image forming apparatus 100 was "In-job". Accordingly, the monitoring terminal 161 re-creates the schedule of the reboot instruction in step S418 by performing a predetermined re-schedule process for a case of "In-job". Then, the process in FIG. 4 finishes.

On the other hand, as a result of the determination in the step S417, when the parameter value of the OID is not "40000", the monitoring terminal 161 determines whether the parameter value of the OID is "40001" in step S420. As a result of the determination, when the parameter value of the OID is "40001", the monitoring terminal 161 is able to determine that the reboot was unavailable because the operating state of the image forming apparatus 100 was "In-maintenance". Accordingly, the monitoring terminal 161 re-creates the schedule of the reboot instruction in step S421 by performing a predetermined re-schedule process in a case for "In-maintenance". Then, the process in FIG. 4 finishes.

On the other hand, as a result of the determination in the step S420, when the parameter value of the OID is not "40001", the control unit 110 determines whether the parameter value of the OID is "50000" in step S422. As a result of the determination, when the parameter value of the OID is not "50000", the monitoring terminal 161 finishes the process in FIG. 4. On the other hand, when the parameter value of the OID is "50000", the monitoring terminal 161 is able to determine that the reboot was not completed because the operating state of the image forming apparatus 100 is "In other process" (i.e., another process was executing). Accordingly, the monitoring terminal 161 re-creates the schedule of the reboot instruction in step S423 by performing a predetermined re-schedule process for a case of "In other process". Then, the process in FIG. 4 finishes.

On the other hand, as a result of the determination in the step S416, when the value of the error-status received is not genErr(5), the monitoring terminal 161 proceeds with the process to step S419. In the step S419, the monitoring terminal 161 performs an SNMP error code process as the other process. That is, the monitoring terminal 161 performs the step S409, after performing the process of the case where the reboot was not instructed to the image forming apparatus 100 as a result.

According to the embodiment, the propriety (available or unavailable) of the reboot is determined on the basis of the operating state of the image forming apparatus 100. Then, when the reboot is available, the information indicating no error (noError(0)) is replied. On the other hand, when the reboot is unavailable, the information (parameter value 209) indicating the factor of the unavailable reboot is replied together with the information indicating the error (genErr (5)). Accordingly, when the image forming apparatus 100 cannot reboot in response to the reboot instruction due to the operating state, the transmitting source of the reboot instruction is notified of the factor. Since the monitoring apparatus distinguishes the reason why the image forming apparatus 100 could not reboot, the situation where a simple retry process that repeats the reboot is performed is avoided. Moreover, since a user arbitrary performs the extension setting of the reply parameter, it is easy to use.

Incidentally, when the extension setting 207 (FIG. 2) is selected for extending the reply parameter, all the monitoring apparatuses connected to the image forming apparatus 100 through the network 160 became reply destinations to which the information indicating the factor of the unavailable reboot is replied. However, the extended parameter value may disturb a suitable operation of a monitoring apparatus. Accordingly, a monitoring apparatus that becomes a reply destination to which the information (parameter value 209) indicating the factor of the unavailable reboot is replied may be restricted (selected). A configuration that individually sets up a monitoring apparatus in which the extension setting of the reply parameter becomes effective will be described with reference to FIG. 5 and FIG. 6.

Figure 5:
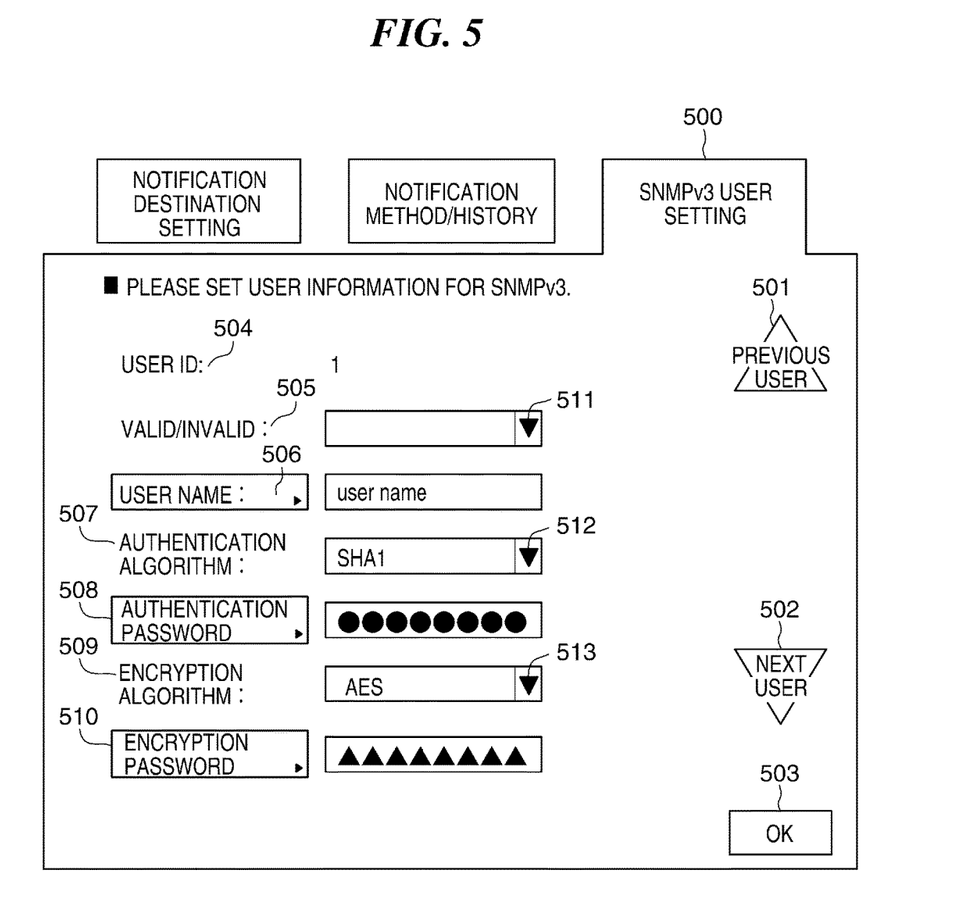
FIG. 5 is a view showing an example of a user setting screen for the SNMPv3 that is displayed on the image forming apparatus shown in FIG. 1.

FIG. 5 is a view showing an example of a user setting screen of the SNMPv3. This user setting screen 500 is displayed on the operation unit 140 of the image forming apparatus 100. The SNMPv3 is standardized by the STD62 in the IETF and is a protocol for communicating using a user-based authentication mechanism and encryption. Since the SNMPv3 allows a plurality of users, buttons 501 and 502 are displayed in the user setting screen 500 to change the screen about the currently setting user to the screen about the previous user or the next user. A user ID 504 is an ID for specifying the user of the SNMPv3 uniquely in the control unit 110. Since the user ID is managed by the control unit 110, it is only displayed and is not operated by the user. A setting item 505 is used for validating/cancelling the SNMPv3 setting corresponding to the user ID 504, and is changed when the user selects valid/invalid in a pulldown setting 511.

A setting item 506 is used for setting up a user name corresponding to the user ID 504. When the user presses the setting item 506, the screen is changed to a software keyboard (not shown) etc. so as to enable input or change of the user name. A setting item 507 is used for setting up an authentication algorithm for authenticating in SNMPv3 communication corresponding to the user name in the setting item 506. The user is able to select it from "No setting", "MD5", and "SHA1" in a pulldown setting 512. An authentication password 508 is used for inputting an authentication password for the authentication algorithm selected in the setting item 507. When the user presses the authentication password 508, a screen the screen is changed to a software keyboard (not shown) etc. so as to enable input or change of the authentication password.

A setting item 509 is used for setting up an encryption algorithm used when the user specified by the user ID 504 communicates with the SNMPv3. The user is able to select it from "No setting", "DES", and "AES" in a pulldown setting 513. A setting item 510 is used for inputting an encryption password for the encryption algorithm selected in the setting item 509. When the user presses the setting item 510, a screen is changed to a software keyboard (not shown) etc. so as to enable input or change of the encryption password. The minimum string length and/or the maximum string length may be established for the setting item 506, the authentication password 508, and the setting item 510. When the user setting for the SNMPv3 is completed and an OK button 503 is pressed, the user setting values for the SNMPv3 are transmitted from the operation unit 140 to the control unit 110, and the control unit 110 communicates in the SNMPv3 on the basis of the received setting values.

Figure 6:
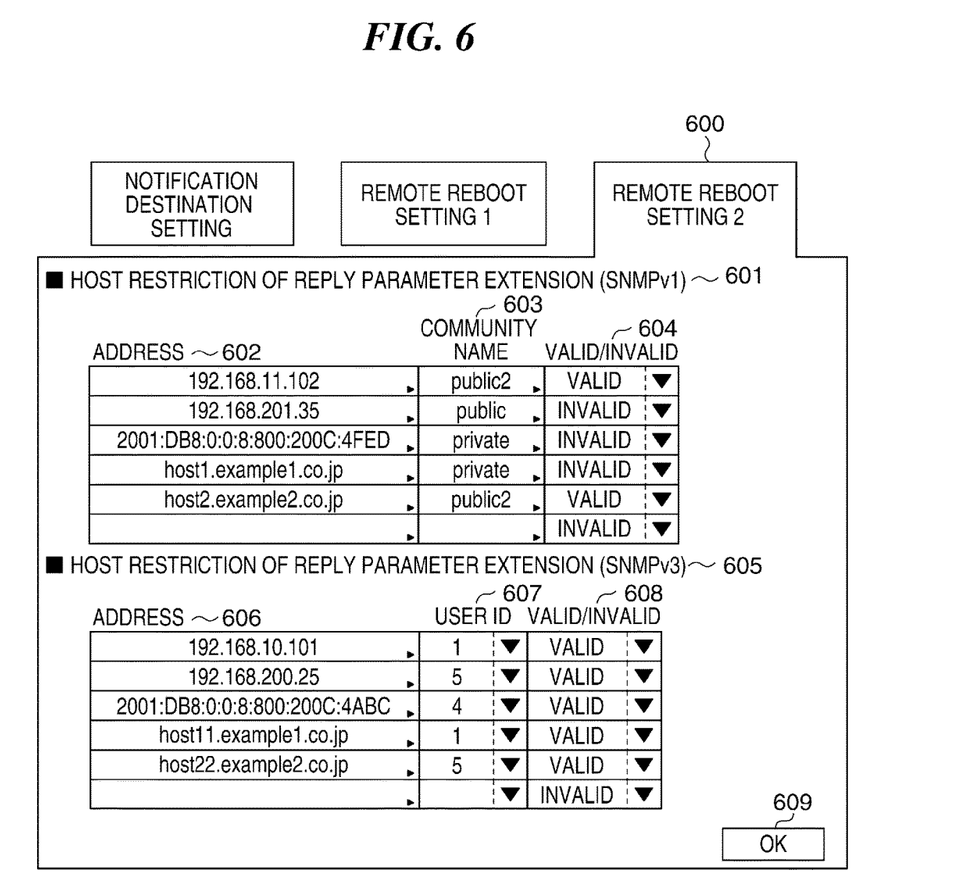
FIG. 6 is a view showing an example of a second setting screen for the remote reboot setting that is displayed on the image forming apparatus shown in FIG. 1.

FIG. 6 is an example of a second setting screen of the remote reboot setting. The second setting screen 600 is displayed on the operation unit 140. A setting screen and setting items about host restriction of extension of the reply parameter will be described with reference to FIG. 6. In the example shown in FIG. 6, a host restriction setting 601 in the SNMPv1 and a host restriction setting 605 in the SNMPv3 are displayed on the second setting screen 600.

The address of the host that replies with extending the reply parameter is registered in an address column 602 in the host restriction setting 601. Settings by an IPv4 address, an IPv6 address, and an FQDN (Fully Qualified Domain Name) are allowed. A name of a community is registered in a community name column 603. In communication in the SNMPv1, the management objects are grouped using the community name, and communication occurs between nodes belonging to the same community. Moreover, a management scope can be changed and an access mode can be switched between "read-only" and "read-write" for a group of the same community name. A valid/invalid column 604 allows each host to switch valid and invalid of the reply parameter extension. The reply parameter extension is uniformly invalid for an address that is not registered in the address column 602.

The address of the host that replies with extending the reply parameter is registered in an address column 606 in the host restriction setting 605. Settings by an IPv4 address, an IPv6 address, and an FQDN (Fully Qualified Domain Name) are allowed. An ID in the SNMPv3 used at the time of notification is registered in a user ID column 607. Details of a user specified by a user ID in the user ID column 607 is set up through the user setting screen 500 (FIG. 5) mentioned above. A user ID in the user ID column 607 is associated with the user ID 504. A valid/invalid column 608 allows each host to switch valid and invalid of the reply parameter extension. The reply parameter extension is uniformly invalid for an address that is not registered in the address column 606.

When the setting about the reply parameter extension in the SNMPv1 and SNMPv3 is completed and an OK button 609 is pressed, a host-restriction-setting value about extension of the reply parameter is transmitted from the operation unit 140 to the control unit 110. The control unit 110 notifies of the SNMP on the basis of the received setting value.

The image forming apparatus 100 determines the monitoring apparatus that performs the remote reboot instruction by performing the settings in FIG. 5 and FIG. 6. That is, the control unit 110 recognizes the monitoring apparatus that is registered in the address column 602 or the address column 606 and that is valid in the reply parameter extension as the reply destination to which the information (parameter value 209) indicating the factor of the unavailable reboot is replied. Accordingly, only when the monitoring apparatus that is the transmitting source of the reboot instruction corresponds to a monitoring apparatus (monitoring apparatus used as a reply destination) of which the reply parameter extension is valid, the parameter value 209 is replied in the steps S312, S314, and S315 in FIG. 3. This enables to reply the information showing the factor of the unavailable reboot only for the monitoring apparatus corresponding to the extension setting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-055437, filed Mar. 18, 2016, which is hereby incorporated by reference herein in its entirety.

What is claimed is:

1. A network device connectable to a network, the network device comprising:

a receiver that receives a reboot instruction through the network;

a user interface that designates whether information indicating a factor why reboot of the network device cannot be performed should be replied;
one or more memories that store instructions; and
one or more processors that execute the instructions to:
   determine whether the reboot of the network device can be performed based on an operating state of the network device;
   in response to the reboot instruction received by the receiver, reply information indicating an error and information indicating the factor why the reboot of the network device cannot be performed in a case where it is determined that the reboot of the network device cannot be performed and the user interface designates that the information indicating the factor why the reboot of the network device cannot be performed should be replied; and
   in response to the reboot instruction received by the receiver, reply information indicating an error without replying the information indicating the factor why the reboot of the network device cannot be performed in a case where it is determined that the reboot of the network device cannot be performed and the user interface designates that the information indicating the factor why the reboot of the network device cannot be performed should not be replied.

2. The network device according to claim 1, wherein the information indicating an error indicates the error using an error code that is prescribed in an SNMP protocol.

3. The network device according to claim 1, wherein the information indicating the factor why the reboot of the network device cannot be performed is a value outside a value range prescribed as an attribute value of an MIB object.

4. The network device according to claim 1, further comprising a printer,
   wherein the operating state includes at least one of execution of a print job or execution of maintenance.

5. The network device according to claim 1, wherein the one or more processors further execute instructions to:
   select a monitoring apparatus used as a reply destination for the information indicating the factor why the reboot of the network device cannot be performed from among a plurality of monitoring apparatuses connected through the network.

6. The network device according to claim 1, wherein the memory further stores instructions which, when executed by the processor, cause the network device to reply information indicating no error in a case where it is determined that the reboot of the network device can be performed.

7. A monitoring system comprising:
a network device connectable to a network, comprising:
   a receiver that receives a reboot instruction through the network;
   one or more memories that store instructions; and
   one or more processors that execute the instructions to:
   determine whether reboot of the network device can be performed based on an operating state of the network device; and
   in response to the reboot instruction received by the receiver, reply information indicating an error and information indicating a factor why the reboot of the network device cannot be performed in a case where it is determined that the reboot of the network device cannot be performed; and a monitoring apparatus that is connectable to the network device through the network, transmits the reboot instruction to the network device through the network according to a reboot schedule, and re-creates the reboot schedule when the information indicating the factor why the reboot of the network device cannot be performed is received from the network device.

8. A control method for a network device connectable to a network, the control method comprising:
   receiving a reboot instruction through the network;
   designating whether information indicating a factor why reboot of the network device cannot be performed should be replied;
   determining whether the reboot of the network device can be performed based on an operating state of the network device;
   in response to receiving the reboot instruction, replying information indicating an error and information indicating the factor why the reboot of the network device cannot be performed in a case where it is determined that the reboot of the network device cannot be performed and it is designated that the information indicating the factor why the reboot of the network device cannot be performed should be replied; and
   in response to receiving the reboot instruction, replying information indicating an error without replying the information indicating the factor why the reboot of the network device cannot be performed in a case where it is determined that the reboot of the network device cannot be performed and it is designated that the information indicating the factor why the reboot of the network device cannot be performed should not be replied.

9. A non-transitory computer-readable storage medium storing a control program causing a computer to execute a control method for a network device connectable to a network, the control method comprising:
   receiving a reboot instruction through the network;
   designating whether information indicating a factor why reboot of the network device cannot be performed should be replied;
   determining whether the reboot of the network device can be performed based on an operating state of the network device;
   in response to receiving the reboot instruction, replying information indicating an error and information indicating the factor why the reboot of the network device cannot be performed in a case where it is determined that the reboot of the network device cannot be performed and it is designated that the information indicating the factor why the reboot of the network device cannot be performed should be replied; and
   in response to receiving the reboot instruction, replying information indicating an error without replying the information indicating the factor why the reboot of the network device cannot be performed in a case where it is determined that the reboot of the network device cannot be performed and it is designated that the information indicating the factor why the reboot of the network device cannot be performed should not be replied.

* * * * *